Oct. 7, 1952        R. L. RUCKMAN        2,612,704
LEVEL TUBE SUPPORT
Filed July 1, 1947
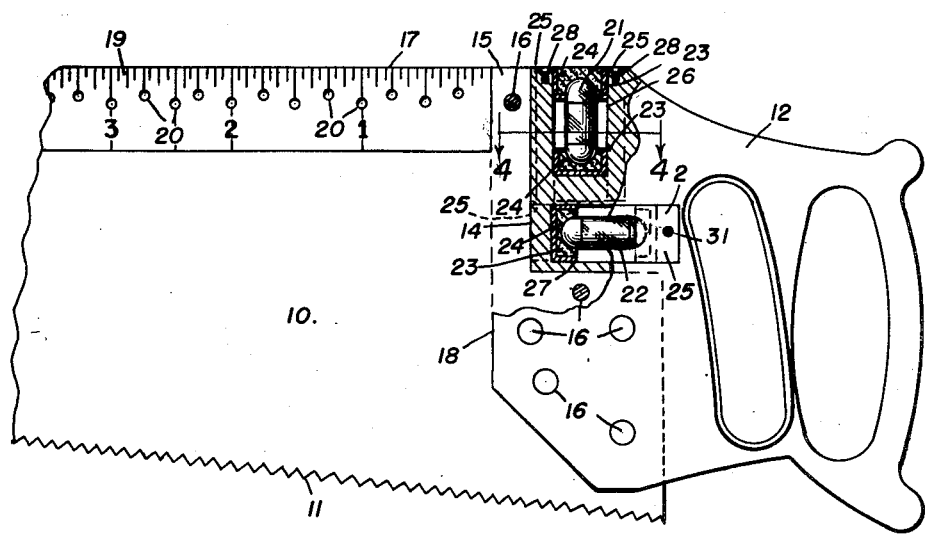
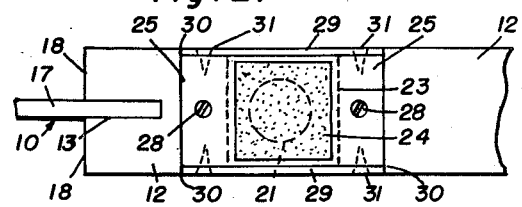
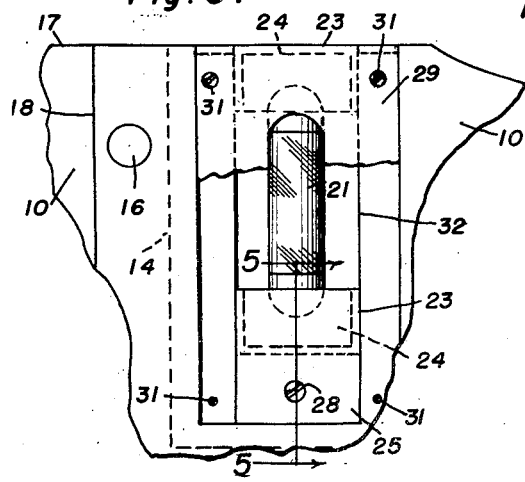
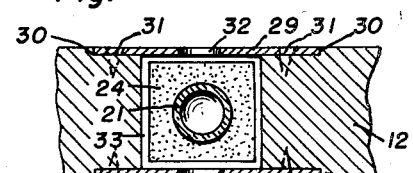
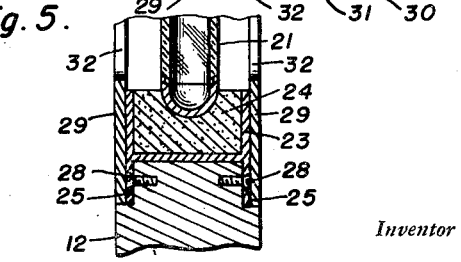
Inventor
Ruben L. Ruckman Patented Oct. 7, 1952

2,612,704

UNITED STATES PATENT OFFICE 2,612,704

LEVEL TUBE SUPPORT

Ruben L. Ruckman, Texas City, Tex., assignor to Arthur M. Stewart, Texas City, Tex.

Application July 1, 1947, Serial No. 758,298

3 Claims. (Cl. 33—211)

This invention relates to a combination saw, square, level and scriber in which spirit levels are mounted in a novel manner in the handle of the saw for use to indicate when parts are level or plumb, and also providing a square in connection with the back edge of the saw blade which is marked or graduated in inches or other linear measure and provided with holes therein uniformly spaced apart at fractions of an inch, to receive a pencil therethrough for sliding the saw along timber to make a straight line for stripping or the like.

Another object of the invention is to provide mountings for the spirit levels to facilitate attachment thereof to the saw handle, which is formed in a novel manner to cooperate with the end of the saw blade also of novel construction, to receive the spirit levels, and secured in position in a manner to protect the levels from injury.

Other objects and advantages reside in the details of construction and operation as more fully hereinafter described and claimed, reference being had to the accompanying drawings forming part hereof, wherein like numerals refer to like parts throughout, and in which:

Figure 1 is a side elevation of a saw with the handle partly broken away and in section, to show the spirit levels and mountings thereof, and the construction for the use of the saw as a square and scriber.

Figure 2 is a fragmentary enlarged plan view of the saw looking at the back of the handle and blade;

Figure 3 is a fragmentary side elevation of the structure shown in Figure 2;

Figure 4 is a sectional view taken on the line 4—4 of Figure 1 enlarged; and

Figure 5 is a sectional view taken on the line 5—5 of Figure 3.

Referring to the drawings in detail, in which like reference characters designate corresponding parts throughout the several views, 10 designates a saw blade having the usual saw teeth 11, the same being a saw blade of the usual hand saw type. The handle of the saw is indicated at 12, and the same is provided with a longitudinal slot or kerf 13 at its attaching end designed to receive the adjacent end of the saw blade 10, which is recessed in the top and back edge at right angles, as indicated at 14. This provides a narrow portion 15 which overlaps the forward edge of the handle at the kerf 13, and the blade and slotted portions of the handle are provided with aligned holes to receive fastening means six in number. This consists of a fastening screw or bolt 16 near the back edge 17 of the saw blade 10 in the adjacent narrow portion 15, and five other cooperating holes and fastening means 16 through the blade 10 and handle 12 at a point below the recess 14, giving a very rigid attachment, which will present the edges 18 at the attaching end of the handle securely and accurately at a 90 degree angle perpendicular or at right angles to the back edge 17 for use as a square. In other words, the projections of the handle on each side of the blade form shoulders and squares on each side for squaring objects. The top edge may also be calibrated or marked off in inches or other linear measure and fractions thereof, as indicated at 19, to form a rule, and the fractional portions, such as each quarter of an inch, may be provided with holes 20 in line with the calibrations or graduations, so as to receive a pencil, for marking or scribing a line along timber, for sawing, stripping or the like and to do away with chalk lines. These holes 20 are preferably staggered as shown.

Mounted in the handle 12 at the recess 14 in close proximity to the edges 18 forming the square, are spirit levels 21 and 22, placed at right angles to each other, parallel with the back edge 17 and at right angles thereto and the edges 18. They are in the form of bulbs or tubes, containing the liquid or water with the usual bubbles of air, the level 21 serving to indicate when a surface is plumb in connection with edges 18 against the surface and the level 22 to indicate when a surface is level, in connection with the back edge 17, or otherwise, as will be apparent, such as using the back edge 17 in connection with the level 21 and the edges 18 in connection with the level 22.

In order to facilitate the mounting of the levels in position, the ends thereof are mounted within cups 23 containing a suitable cement or plaster of Paris 24, in which the ends are imbedded and anchored, while the cups are provided with opposed apertured ears 25 at opposite faces thereof, for anchoring the cups in spaced relation in recesses or cut-outs 26 and 27 in the handle at right angles to each other, where they are secured by fastening means or screws 28. Cover plates 29 are also secured in recesses in opposite faces of the handle 12, as indicated at 30, so as to lie flush with said faces, the fastening means being indicated as screws 31. The side openings 32 are also provided in the plates 29, through which the air bubbles of the spirit levels may be viewed to determine when objects are level or plumb. Obviously, the spirit levels, that is the bulbs or tubes thereof may be anchored in the cups mounted in position in the cut-outs, recesses or pockets in the top and sides of the handle so as to be anchored as a single structure or assembly applied by insertion with the level or bulb 21 parallel to the edge of the recess 14 and the level 22 parallel to the bottom edge of said recess or at right angles to the vertical edge thereof, one below the other with the levels both located adjacent to the edges 18 of the square. Also, the levels are readily visible, and a special advantage is derived by placing the plumb level in the center of the handle, for use with the saw in either position, that is with the back edge and teeth either up or down. This places the spirit level 22 between the ends of the edges 18 at the inner end of the handle, so as to cooperate with said edges at either side of the right angular position of the spirit level 22. The back edge of the saw also serves as a rule in connection with the graduations 19.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. A leveling device comprising a support having an opening therein, a pair of registering cups anchored within the opening, said cups having flat side walls, a liquid containing bulb having an air bubble, the ends of said bulb being received within the cups, cement in the cups and anchoring the bulb to the cups, said support including flat side faces through which said opening extends, said side faces having recesses therein about the opening, and cover plates mounted in the recesses against the flat side walls of said cups, said cover plates having slots in registry with said bulb.

2. The combination of claim 1 wherein each of said cups includes a pair of attaching ears received in said recesses behind said cover plates, said cover plates being flush with the side faces of said support and including ends overlapping said ears.

3. A leveling device comprising a support having a hand grip and first and second elongated openings, said openings being disposed relatively perpendicular, a pair of registering cups anchored in each of said openings and having flat side walls, a pair of liquid containing bulbs each having an air bubble, the ends of one bulb being anchored in one pair of cups and the ends of the other bulb being anchored in the other pair of cups, said support having side faces through which the openings extend and recesses in the side faces about the openings, a pair of cover plates for each opening and secured to the support and within the recesses and engaging the flat side walls of said cups, said plates including slots in registry with said bulbs.

RUBEN L. RUCKMAN.

REFERENCES CITED

The following references are of record in the file of this patent:

UNITED STATES PATENTS

| Number | Name | Date |
|---|---|---|
| 287,342 | Van Alstyne | Oct. 23, 1883 |
| 948,059 | Larson et al. | Feb. 1, 1910 |
| 1,130,552 | Trenholm | Mar. 2, 1915 |
| 1,172,971 | Frank | Feb. 22, 1916 |
| 1,217,286 | Dewees | Feb. 27, 1917 |
| 1,231,338 | Desrochers | June 26, 1917 |
| 1,251,349 | Day | Dec. 25, 1917 |
| 1,280,994 | Hand | Oct. 8, 1918 |
| 1,700,815 | Shooter | Feb. 9, 1929 |
| 1,884,469 | Winter | Oct. 25, 1932 |
| 2,118,470 | Melvin | May 24, 1938 |
| 2,133,095 | Holfelner | Oct. 11, 1938 |
| 2,240,807 | Shaw | May 6, 1941 |
| 2,321,223 | Loughlin | June 8, 1943 |
| 2,466,829 | Sprinkel | Apr. 12, 1949 |